(12) United States Patent
Yamazaki et al.

(10) Patent No.: US 6,768,819 B2
(45) Date of Patent: Jul. 27, 2004

(54) IMAGE PROCESSING APPARATUS AND METHOD, AND STORAGE MEDIUM USED THEREWITH

(75) Inventors: Takeshi Yamazaki, Kanagawa (JP); Makoto Sato, Tokyo (JP); Hiroshi Kajiwara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 563 days.

(21) Appl. No.: 09/797,885

(22) Filed: Mar. 5, 2001

(65) Prior Publication Data

US 2001/0031094 A1 Oct. 18, 2001

(30) Foreign Application Priority Data

Mar. 10, 2000 (JP) .................................. 2000-066377

(51) Int. Cl.[7] .............................. G06K 9/46; H04N 7/12
(52) U.S. Cl. .................. 382/240; 382/248; 375/240.19
(58) Field of Search ............................... 382/240, 248, 382/247, 246; 375/240.11, 240.19

(56) References Cited

U.S. PATENT DOCUMENTS

| | | | |
|---|---|---|---|
| 5,321,776 A | * 6/1994 | Shapiro | 382/240 |
| 5,402,248 A | 3/1995 | Sato et al. | 358/426 |
| 5,812,146 A | 9/1998 | Sato et al. | 345/501 |
| 5,861,892 A | 1/1999 | Sato et al. | 345/435 |
| 5,945,930 A | 8/1999 | Kajiwara | 341/50 |
| 6,028,963 A | 2/2000 | Kajiwara | 382/239 |
| 6,031,938 A | 2/2000 | Kajiwara | 382/239 |
| 6,101,282 A | 8/2000 | Hirabayashi et al. | 382/246 |
| 6,233,355 B1 | 5/2001 | Kajiwara | 382/238 |

FOREIGN PATENT DOCUMENTS

| | | | |
|---|---|---|---|
| EP | 0905651 | 9/1998 | G06T/9/00 |
| JP | 11-103460 | 4/1999 | H04N/7/30 |

* cited by examiner

*Primary Examiner*—Leo Boudreau
*Assistant Examiner*—Duy M. Dang
(74) *Attorney, Agent, or Firm*—Fitzpatrick, Cella, Harper & Scinto

(57) ABSTRACT

An image processing apparatus and method perform an efficient wavelet transform to provide sub-bands having a unit size for being encoded in an encoding device in a post-stage. In accordance with one embodiment of the present invention, the image processing apparatus includes a transform unit for performing a two-dimensional discrete wavelet transform on an input image to generate a plurality of frequency components, and an entropy encoding unit for performing entropy encoding on each of the frequency components in M×N-sized units. In a first encoding mode, the transform unit performs the two-dimensional discrete wavelet transform on the image either a predetermined number of times or for a number of times which allows a lowest frequency component (LL) to have a size of M×N, and in a second encoding mode, the transform unit performs the two-dimensional discrete wavelet transform on the image the predetermined number of times.

21 Claims, 7 Drawing Sheets

1-DIMENSIONAL WAVELET TRANSFORM ONLY (HORIZONTAL DIRECTION)

2-DIMENSIONAL WAVELET TRANSFORM (ONLY ONCE)

2-DIMENSIONAL WAVELET TRANSFORM (2ND TIME)

INPUT IMAGE DATA

DEFAULT NUMBER OF TIMES OF TRANSFORMATION

2-DIMENSIONAL DISCRETE WAVELET TRANSFORM

2-DIMENSIONAL DISCRETE WAVELET TRANSFORM

TO QUANTIZATION UNIT 3

2-DIMENSIONAL DISCRETE WAVELET TRANSFORM

TO QUANTIZATION UNIT 3

(ENLARGED)

COEFFICIENT OF IMAGE 1
COEFFICIENT OF IMAGE 2
COEFFICIENT OF IMAGE 3

TO QUANTIZATION UNIT 3

FIG. 7A
FIG. 7B
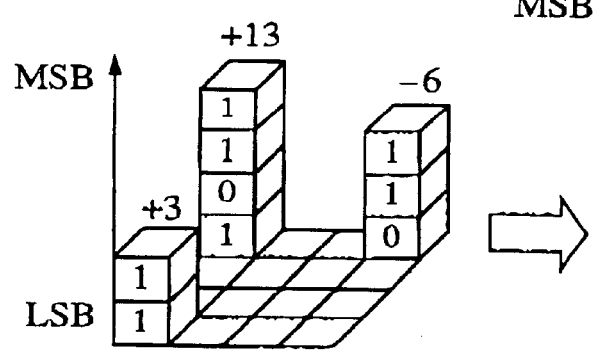
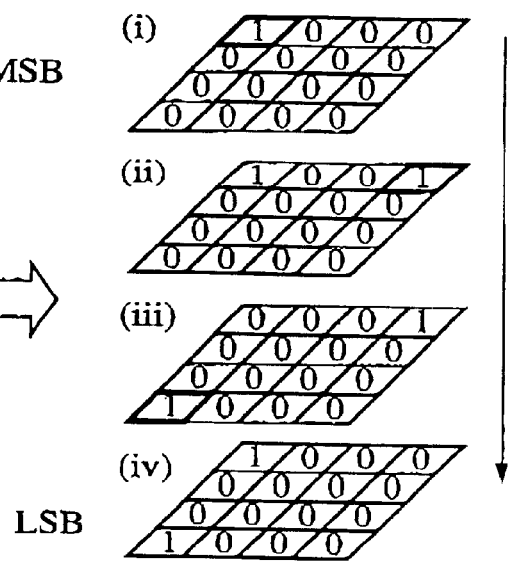

US 6,768,819 B2

IMAGE PROCESSING APPARATUS AND METHOD, AND STORAGE MEDIUM USED THEREWITH

BACKGROUND OF THE INVENTION

1. Field of the Invention

The present invention relates to an image processing apparatus and method that use wavelet transforms to compress images, and to a medium containing a program for implementing the method.

2. Description of the Related Art

Recently, image compression/encoding using wavelet transforms has attracted attention. For example, after an image to be encoded is divided into a plurality of frequency bands (sub-bands) by performing a wavelet transform on the image, transform coefficients in each frequency band are quantized, and the quantized transform coefficients are then entropy-encoded.

One known method for performing a wavelet transform on an original image includes performing horizontal one-dimensional filtering on the original image so as to separate high frequency components and low frequency components, subsequently performing a vertical one-dimensional dimensional filtering on the image, to divide the original image into four sub-bands, LL, LH, HL, and HH, and performing similar processing on LL, which corresponds to low frequency components, to further divide LL into four sub-bands.

The number of times the division of the image should be performed must be optimized depending on the content of the image, etc.

However, conventionally, an optimal method for determining the number of times the sub-band division is performed has not been established.

SUMMARY OF THE INVENTION

Accordingly, It is an object of the present invention to perform an efficient wavelet transform to provide sub-bands having a size suitable for being encoded in an encoding unit in a post-stage. In particular, it is an object of the present invention to perform a wavelet transform in which the number of times an original image is divided is optimal.

To these ends, according to an aspect of the present invention, the foregoing objects are achieved through provision of an image processing apparatus including an input unit for inputting an image, a transform unit for performing a two-dimensional discrete wavelet transform on the image to generate a plurality of frequency components, and an entropy encoding unit for performing entropy encoding on each of the frequency components in M×N-sized units, where M and N each represent an integer equal to or greater than 1. In a first encoding mode, the transform unit performs the two-dimensional discrete wavelet transform on the image either a predetermined number of times or for a number of times which allows a lowest frequency component to have a size of M×N. In a second encoding mode, the transform unit performs the two-dimensional discrete wavelet transform on the image the predetermined number of times.

According to another aspect of the present invention, the foregoing objects are achieved through provision of an image processing apparatus including an input unit for inputting an image, a transform unit for performing a two-dimensional discrete wavelet transform on the image to generate a plurality of frequency components, and an entropy encoding unit for performing entropy encoding on each of the frequency components in M×N-sized units, where M and N each represent an integer equal to or greater than 1. The transform unit performs the two-dimensional discrete wavelet transform on the image either a predetermined number of times or for a number of times which allows a lowest frequency component to have a size of M×N.

According to another aspect of the present invention, the foregoing objects are achieved through provision of an image processing apparatus including an input unit for inputting an image, a transform unit for performing a two-dimensional discrete wavelet transform on the image to generate a plurality of frequency components, and an entropy encoding unit for performing entropy encoding on each of the frequency components in M×N-sized units, where M and N each represent an integer equal to or greater than 1. The transform unit performs the two-dimensional discrete wavelet transform on the image for a number of times which allows a lowest frequency component to have a size of M×N.

According to another aspect of the present invention, the foregoing objects are achieved through provision of an image processing apparatus including an input unit for inputting an image, a transform unit for performing a two-dimensional discrete wavelet transform on the image to generate a plurality of frequency components, and an entropy encoding unit for performing entropy encoding on each of the frequency components in M×N-sized units, where M and N each represent an integer equal to or greater than 1. In a first encoding mode, the transform unit performs the two-dimensional discrete wavelet transform on the image a predetermined number of times or for a number of times which allows a lowest frequency component to have a predetermined size that is a function of a size of M×N, and in a second encoding mode, the transform unit performs the two-dimensional discrete wavelet transform on the image until the predetermined number of times.

According to another aspect of the present invention, the foregoing objects are achieved through provision of an image processing apparatus including an input unit for inputting an image, a transform unit for performing a two-dimensional discrete wavelet transform on the image to generate a plurality of frequency components, and an entropy encoding unit for performing entropy encoding on each of the frequency components in M×N-sized units, where M and N each represent an integer equal to or greater than 1. The transform unit performs the two-dimensional discrete wavelet transform on the image until a predetermined number of times or for a number of times which allows a lowest frequency component to have a predetermined size that is a function of a size of M×N.

According to another aspect of the present invention, the foregoing objects are achieved through provision of an image processing apparatus including an input unit for inputting an image, a transform unit for performing a two-dimensional discrete wavelet transform on the image to generate a plurality of frequency components, and an entropy encoding unit for performing entropy encoding on each of the frequency components in M×N-sized units, where M and N each represent an integer equal to or greater than 1. The transform unit performs the two-dimensional discrete wavelet transform on the image for a number of times which allows a lowest frequency component to have a predetermined size that is a function of a size of M×N.

According to a further aspect of the present invention, the foregoing object is achieved through provision of a computer-readable storage medium containing an image processing program including code for performing a transform step for performing a two-dimensional discrete wavelet transform on an input image to generate a plurality of frequency components, and an entropy encoding step for performing entropy encoding, in M×N-sized units, on each of the frequency components obtained in the transform step, where M and N each represent an integer equal to or greater than 1. In a first encoding mode, the transform step performs the two-dimensional discrete wavelet transform on the image either a predetermined number of times or for a number of times which allows a lowest frequency component to have a size of M×N, and in a second encoding mode, the transform step performs the two-dimensional discrete wavelet transform on the image the predetermined number of times.

Further objects, features and advantages of the present invention will become apparent from the following description of the preferred embodiments with reference to the attached drawings.

BRIEF DESCRIPTION OF THE DRAWINGS

FIGS. 7A and 7B are illustrations of an entropy encoding process.

DESCRIPTION OF THE PREFERRED EMBODIMENTS

Preferred embodiments of the present invention are described below in order.
First Embodiment A first embodiment of the present invention will now be described.

Figure 1:
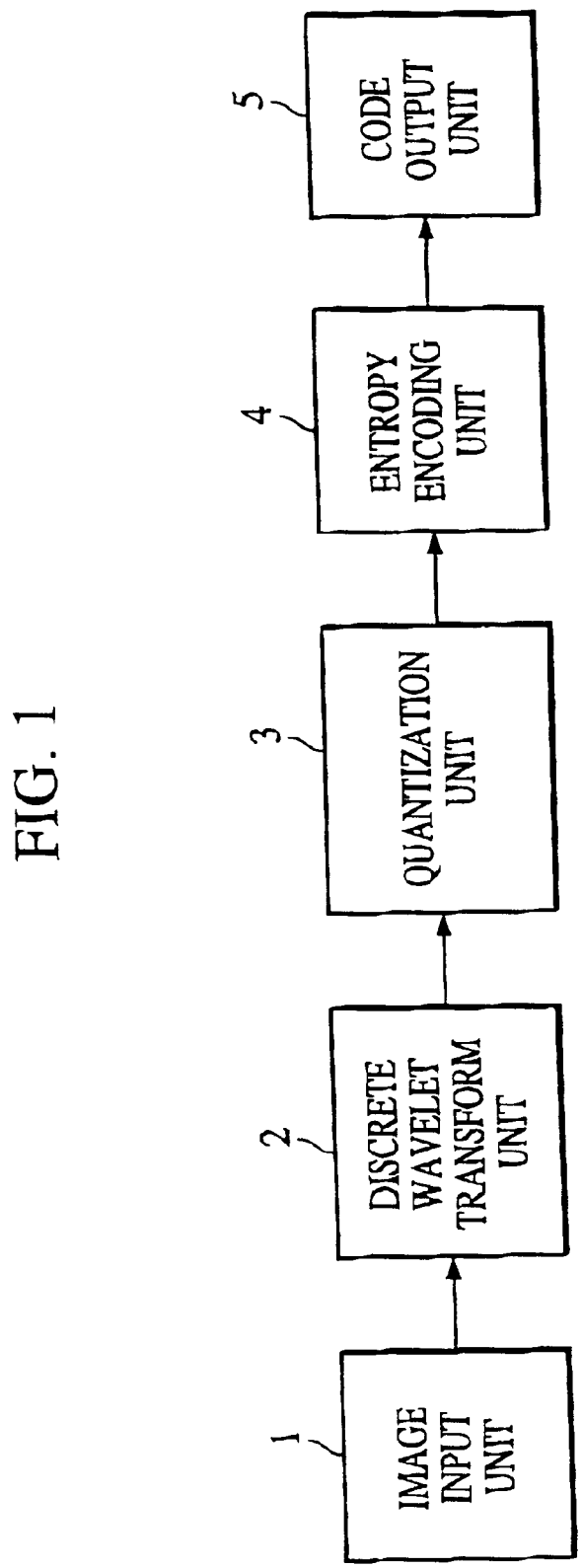
FIG. 1 is a block diagram showing an image processing apparatus according to the present invention.

FIG. 1 shows the entire structure of an image processing apparatus according to the first embodiment. The image processing apparatus includes an image input unit 1, a discrete wavelet transform unit 2, a quantization unit 3, an entropy encoding unit 4, and a code output unit 5.

The operation of each unit will now be described in order.
Image Input Unit 1

Image data to be encoded is input to the image input unit 1. The image input unit 1 may be a device such as a camera or a scanner, or an interface for receiving data. The input image data is transferred to the discrete wavelet transform unit 2 in the next stage.

For brevity of description, the first embodiment is described on the assumption that the image data to be encoded represents a multi-level monochrome image. However, the present invention is not limited only to such a case, and can also be applied to the encoding of a plurality of color component data representing a color image In that case, each color component data, or each brightness and chromaticity component data may be compressed as the above single image data a number of times in a manner as would be understood by one skilled in the art.
Discrete Wavelet Transform Unit 2

The discrete wavelet transform unit 2 generates transform coefficients by performing two-dimensional discrete wavelet transform processing on the input image data.

Figure 2:
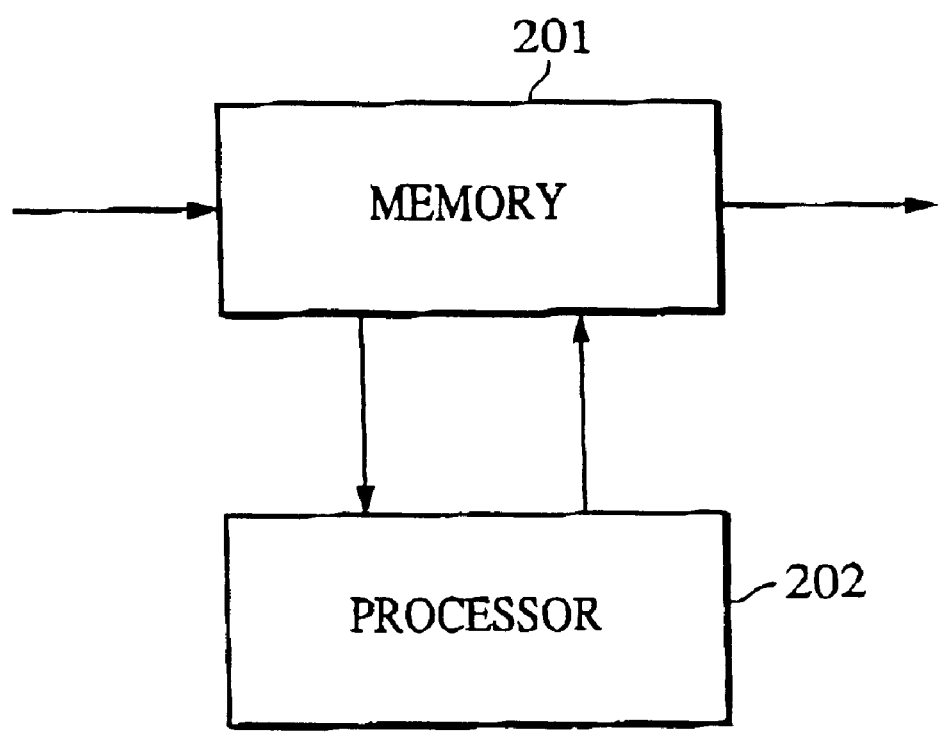
FIG. 2 is a block diagram showing the internal structure of the discrete wavelet transform unit 2 shown in FIG. 1.

FIG. 2 shows the internal structure of the discrete wavelet transform unit 2 according to an embodiment of this invention. The input image data are temporarily stored in a memory 201. A processor 202 sequentially reads data to be processed from the memory 201, performs discrete wavelet transforms on the data, and writes the transformed data in the memory 201 again.

The details of the discrete wavelet transform technique itself are omitted in this description since such techniques are known in the art, as disclosed in Japanese Unexamined Patent Application Publication No. 11-103460. For example, by performing the discrete wavelet transform on input image data, transform coefficients are obtained as shown FIGS. 3A to 3C.

Figure 3A:
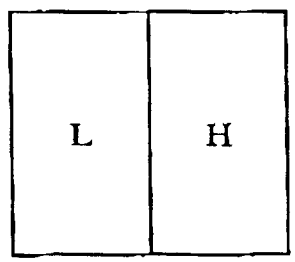
FIGS. 3A, 3B, and 3C are illustrations of a discrete wavelet transform process.
Figure 3B:
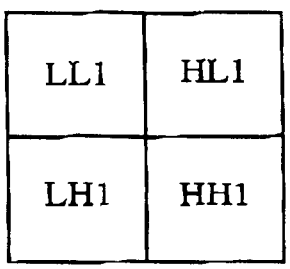

First, by performing a one-dimensional (e.g., horizontal) discrete wavelet transform on the input image data, a high-frequency component H and a low-frequency component L are obtained, as shown in FIG. 3A. Second, by performing the one-dimensional discrete wavelet transform on each of the obtained components H and L in another direction (e.g., the vertical direction), two-dimensional discrete wavelet transform coefficients are obtained in FIG. 3B. In FIG. 3B, a two-dimensional discrete wavelet transform coefficient that is obtained by horizontally and vertically extracting high-frequency components corresponds to HH1, a two-dimensional discrete wavelet transform coefficient that is obtained by horizontally extracting a low-frequency component and vertically extracting a high-frequency component corresponds to LH1, a two-dimensional discrete wavelet transform coefficient that is obtained by horizontally extracting a high-frequency component and vertically extracting a low-frequency component corresponds to HL1, and a two-dimensional discrete wavelet transform coefficient that is obtained by horizontally and vertically extracting low-frequency components corresponds to LL1. In encoding using the discrete wavelet transform, normally, the number of the obtained two-dimensional discrete wavelet transform coefficients is equal to the number of pixels constituting the original image.

Figure 3C:
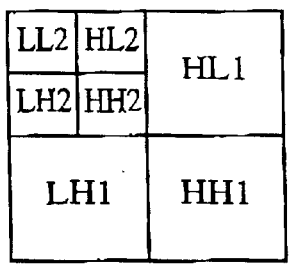

Since LL1 is actually a reduced image of the input image data, the performance of the two-dimensional discrete wavelet transform on only LL1 again is known for the purpose of increasing encoding efficiency This provides coefficients as shown in the top left quarter of FIG. 3C. In the top left quarter of FIG. 3C, a coefficient that is obtained by horizontally and vertically extracting high-frequency components from LL1 corresponds to HH2, a coefficient that is obtained by horizontally extracting a low-frequency component from LL1 and vertically extracting a high-frequency component from LL1 corresponds to LH2, a coefficient that is obtained by horizontally extracting a high-frequency component from LL1 and vertically extracting a low-frequency component from LL1 corresponds to HL2, and a coefficient that is obtained by horizontally and vertically extracting low-frequency components from LL1 corresponds to LL2. The number of the obtained coefficients shown in the top left quarter of FIG. 3C is equal to the number of pixels constituting the original image.

Conventionally, the performance of the discrete wavelet transform a predetermined number of times is known.

The present invention is characterized in that the number of times the discrete wavelet transform is performed on the input image data by the discrete wavelet transform unit 2 is variably controlled as described below.

Figure 4:
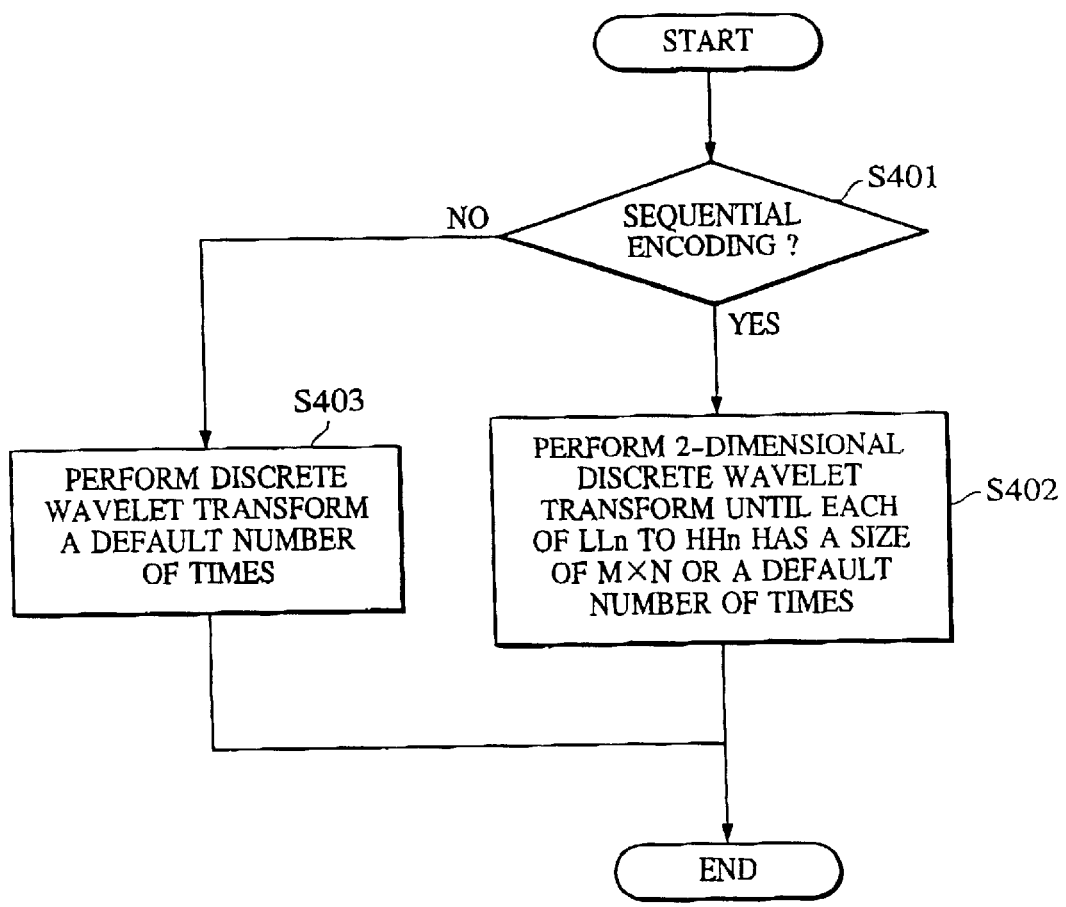
FIG. 4 is a flowchart illustrating a process for determining the number of times a discrete wavelet transform is performed.

FIG. 4 shows a simplified process for determining the number of times the discrete wavelet transform is performed. The determining process may be performed in the discrete wavelet transform unit 2 or by a central processing unit (not shown) in the image processing apparatus shown in FIG. 1.

First, the process detects an encoding mode. Specifically, the process finds whether the image processing apparatus is in a sequential encoding mode (e.g., a real-time transmission mode) or another encoding mode (e.g., a mode for storing data to a hard disk) (step S401 In FIG. 4).

If the image processing apparatus is in the sequential encoding mode, the process proceeds to step S402. If the other mode is activated, the determining process proceeds to step S403. In the sequential encoding mode, after generating encoded data for one input image (image data to be processed at a time by the discrete wavelet transform), encoded data for the next image are generated. The sequential encoding mode is suitable for uses such as real-time transmission of image data. In the other encoding mode (non-sequential encoding mode), before completing the generation of encoded data for one initial input image (image data to be processed at a time by the discrete wavelet transform), encoded data for the next image are generated. This other encoding mode is not suitable for real-time transmission, but can perform data compression faster than that by the sequential encoding mode.

Sequential Encoding Mode

According to this invention, in the sequential encoding mode, the process performs the two-dimensional discrete wavelet transforms either until each of LLn, LHn, HLn, and HHn has a size of M×N or until a default number of transforms has been completed (step S402 in FIG. 4).

For example, when the default number of times for which the process performs the two-dimensional discrete wavelet transform is set at two, if each of LLn, LHn, HLn, and HLn already has a size of M×N after performing the two-dimensional discrete wavelet transform once, the process is terminated. In other words, transforming to the coefficients shown in FIG. 3C is not performed in that case.

The size M×N unit is a unit for use in performing entropy encoding (arithmetic encoding) at a post-stage on each of the frequency components LH1, HL1, RH1, LH2, HL2, HH2 . . . LHn, HLn, HHn, and LLn that are obtained by performance of the discrete wavelet transform. When each of the frequency components has a size larger than M×N, entropy encoding (arithmetic encoding) is performed after performing division into a plurality of blocks of size M×N. In addition, after performing the discrete wavelet transform, data processing is always performed using M×N-sized units. Thus, it is important to generate data having a size of M×N prior to to performing the procedures implemented after the discrete wavelet transform.

The above-described process will now be described using another-specific example. A case is considered in which, in FIGS. 5A to 5C, the discrete wavelet transform is performed on an image having a size of 4M×4N and the default number of times in which the two-dimensional discrete wavelet transform is performed is set at three.

Figure 5A:
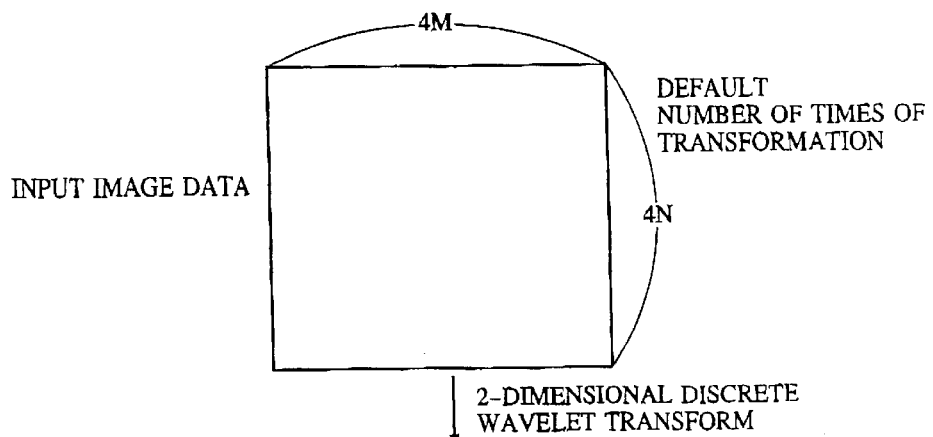
FIGS. 5A, 5B, and 5C are illustrations of a discrete wavelet transform process in a sequential encoding mode.
Figure 5B:
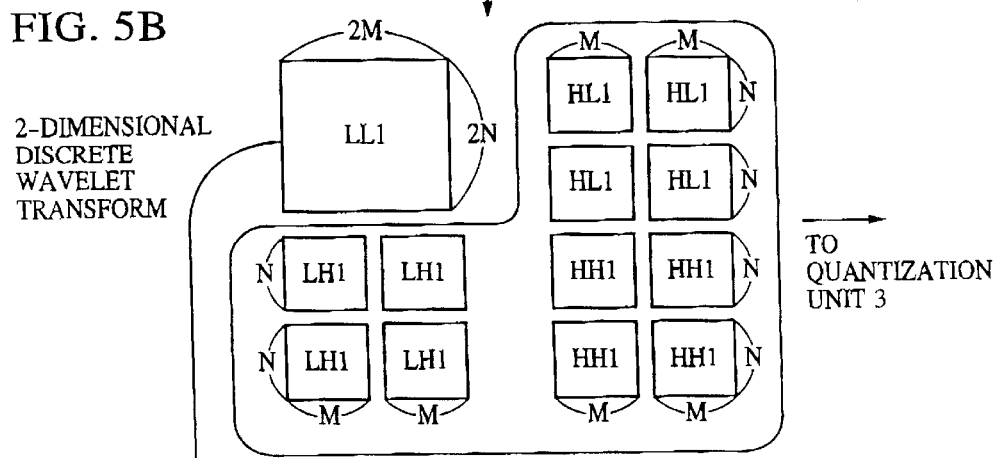
Figure 5C:
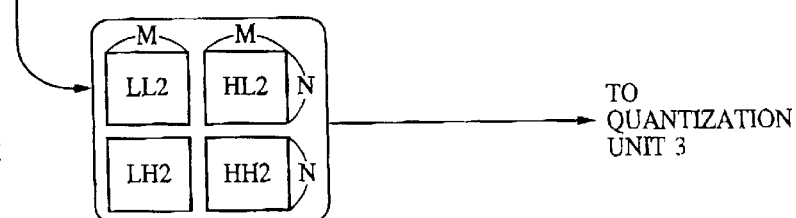

FIG. 5A shows input image data that is stored in the memory 201 via the image input unit 1. By performing the two-dimensional discrete wavelet transform on the input image data (shown in FIG. 5A) once, the processor 202 (in FIG. 2) obtains various coefficients. Each of the coefficients, namely, LL1, HL1, LH1, and HH1 has a size of 2M×2N (see LL1 in FIG. 5B). At this time, HL1, LH1, and HH1 do not need to be processed further by the two-dimensional discrete wavelet transform. Accordingly, by simply dividing each of HL1, LH1, and HH1 into four parts each having a size of M×N, which is a unit size for post-stage quantization or entropy encoding (arithmetic encoding), twelve coefficient blocks of the transformed data are obtained (FIG. 5B) and transferred to the quantization unit 3 for successive quantization.

Also, LL1 does not yet have a size of M×N, and the two-dimensional discrete wavelet transform has been performed only once. Accordingly, the two-dimensional discrete wavelet transform is performed a second time fo that coefficient. This provides the coefficients LL2, HL2, LH2, and HH2 shown in FIG. 5C.

As a result, the two-dimensional discrete wavelet transform has been performed only twice, but each of LL2, HL2, LH2, and HH2 has a size of M×N. Thus, no further two-dimensional discrete wavelet transform is performed, and these four coefficients LL2, HL2, LH2, and HH2 are output to the quantization unit 3.

Non-sequential Encoding Mode

In the non-sequential encoding mode (the other encoding mode) the two-dimensional discrete wavelet transform is always performed a predetermined number of times specified by a default value (step S403 in FIG. 4). When the discrete wavelet transform unit 2 is set to perform the two-dimensional discrete wavelet transform twice as specified by the default value, the two-dimensional discrete wavelet transform is forcibly performed twice regardless of the sizes of LLn, LHn, HLn, and HHn.

Referring to FIGS. 3A to 3C, if each of LL1, LH1, HL1, and HH1 has a size of M×N in FIG. 3B, despite this condition, the discrete wavelet transform unit 2 terminates the processing after performing the two-dimensional discrete wavelet transform twice. That is, transforming into the coefficients shown in FIG. 3C is performed.

The above-described process will now be described using another specific example. A case is considered in which, in FIGS. 6A to 6D, the discrete wavelet transform is performed on an image having a size of 4M×4N and the default number of times the two-dimensional discrete wavelet transform is performed is set at three.

Figure 6A:
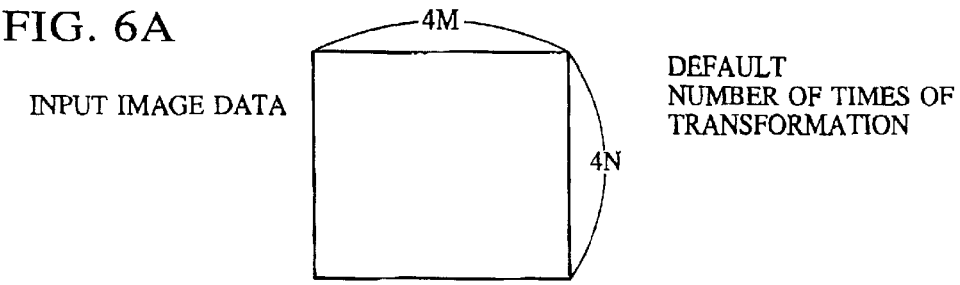
FIGS. 6A, 6B, 6C, and 6D are illustrations of a discrete wavelet transform process in a non-sequential encoding mode.

FIG. 6A shows input image data which is stored in the memory 201 (in FIG. 2) via the image input unit 1 (in FIG. 1). The processor 202 (in FIG. 2) performs the two-dimensional discrete wavelet transform once on the input image data shown in FIG. 6A, and obtains various coefficients LL1 (FIG. 6B), HL1, LH1, and HH1, each having a size of 2M×2N. At this time, HL1, LH1, and HH1 do not need to be further processed by the two-dimensional discrete wavelet transform. Accordingly, by simply dividing each of HL1, LH1, and HH1 into four parts each having a size of M×N, which is the unit size for post-stage quantization or entropy encoding (arithmetic encoding), twelve coefficient blocks of the transformed data are obtained (FIG. 6B) and transferred to the quantization unit 3 for successive quantization.

Next, since the two-dimensional discrete wavelet transform has been performed only once, the two-dimensional discrete wavelet transform is performed a second time to coefficient LL1. This provides the coefficients LL2, HL2, LH2, and HH2 shown in FIG. 6C.

As a result, each of LL2, HL2, LH2, and HH2 has a size of M×N. However, in this encoding modes the two-dimensional discrete wavelet transform is performed on LL2 a third time regardless of the size of each frequency component. Since HL2, LH2, and HH2 do not need to be processed again by the two-dimensional discrete wavelet transform, they are transferred to the quantization unit 3 (FIG. 1) at the next stage for successive quantization. Here, since each of HL2, LH2, and HH2 has a size of M×N, each coefficient is unchanged and transferred to unit 3.

Figure 6B:
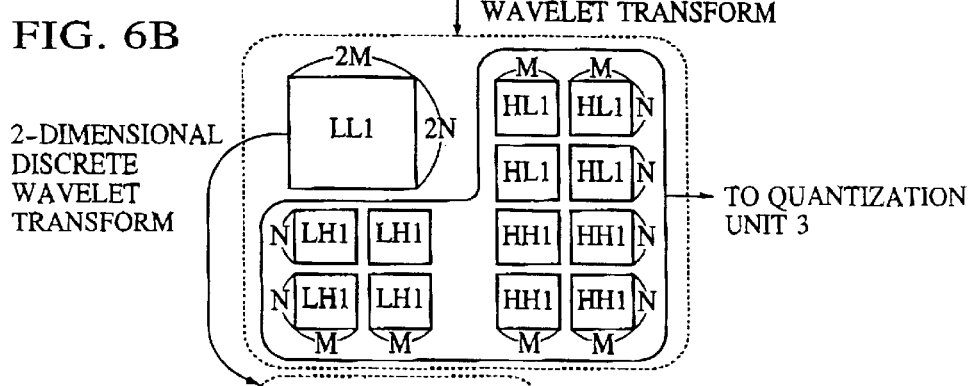
Figure 6C:
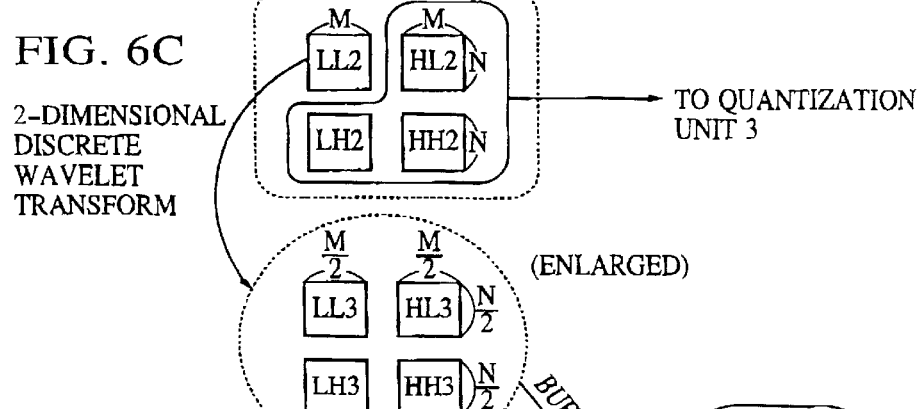
Figure 6D:
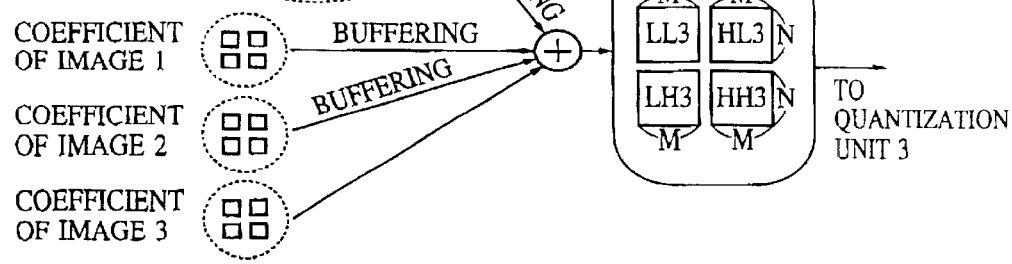

Although LL3, HL3, LH3, and HH3 shown in FIG. 6D are obtained by performing the two-dimensional discrete wavelet transform the third time, they each have a size of (M/2)×(N/2) that is smaller than the size of data to be processed in the post-stage by quantization and entropy encoding. Accordingly, LL3, HL3, LH3, and HH3 are temporarily held in the memory 201 (in FIG. 2). The held coefficients are not immediately transferred to the quantization unit 3. When LL3, HL3, LH3, and HH3 that each have a size of M×N are obtained by combining the held coefficients with coefficients obtained by performing the two-dimensional discrete wavelet transform on subsequently input data of other images 1 to 3 shown in FIG. 6D, they are transferred to the quantization unit 3.

In general, the input image data having a size of 4M×4N frequently corresponds to the image data of each of block-shaped parts obtained by dividing a large image for the whole screen. Accordingly, there are many cases in which the image data having a size of 4M×4N is successively input, and the above-described coefficients LL3, HL3, LH3, and HH3 are easily obtained. The present invention is described assuming these cases. However, the present invention can be applied to other cases. For example, the present invention can be applied even to a case in which the other images 1 to 3 are not generated in accordance with the image size or shape.

The coefficients LH1, HL1, and HH1 shown in FIG. 6B, and are the coefficients shown in FIG. 6C, obtained by performing the two-dimensional discrete wavelet transform under the above-described control, are transferred to the quantization unit 3 at the next stage.

Quantization Unit 3

The quantization unit 3 quantizes the M×N-sized frequency-component data that are sequentially transferred from the discrete wavelet transform unit 2, and transfers the resulting quantized data to the entropy encoding unit 4 at the next stage.

Entropy Encoding Unit 4

The entropy encoding unit 4 outputs encoded data by decomposing the quantized M×N-sized frequency-component data (quantization indices) into bit planes, and performing binary arithmetic encoding in bit-plane units.

FIGS. 7A and 7B show an example of a process in which certain frequency-component data (quantization indices) is encoded for each bit plane, where each of M and N is equal to 4. Apart from three quantization indices (−6, +3, and +13), the other quantization indices are all zeros. The quantization indices are decomposed into four bit planes (i) to (iv), and binary arithmetic encoding is performed in order from the most significant bit (MSB) to the least significant bit (LSB).

When, in the process of encoding each bit plane, a value other than zero is detected for the first time at each of 16 divided positions (in other words, just after it is found that each of the quantization indices has a value other than zero), one bit ("1" or "0") representing a positive or negative sign is added, and the entropy encoding (arithmetic encoding) is performed. In FIG. 7B, the top-left-corner bit "1" in the bold-line square in the top portion (i) of FIG. 7B is encoded with a positive-sign representing bit "1" (not shown) that is added just after it, the top-right-corner bit "1" in the bold-line square in the portion (ii) of FIG. 7B is encoded with a negative-sign-representing bit "0" (not shown) that is added just after it, and the bottom-left-corner bit "1" in the bold-line square in the portion (iii) of FIG. 7B is encoded with a positive-sign representing bit "1" (not shown) that is added just after it.

Code Output Unit 5

The thus obtained encoded data that corresponds to one or a plurality of images is then transmitted to an external unit (not shown) via the unit 5 and a suitable transmission link, or is transferred to an internal or external storage unit (not shown).

By way of example, when among the above-described encoding modes the sequential encoding mode is used, an encoded-data receiving-and-decoding side can also independently reproduce each image in accordance with the order of images encoded by the encoding side. When the non-sequential encoding mode is used on the other hand, each image cannot be independently decoded, but there is a possibility that the amount of received encoded data is reduced to be less than that in the sequential encoding mode.

According to the first embodiment described above, an efficient wavelet transform can be performed to provide sub-bands having a size suitable for being processed in an M×N-sized unit for encoding In a post-stage.

Second Embodiment

The above-described first embodiment controls, according to the encoding mode, the number of times the two-dimensional discrete wavelet transform is performed. However, the present invention is not limited to the first embodiment. For example, if the encoding efficiency In the non-sequential encoding mode cannot greatly differ from that obtained in the sequential encoding mode, the first embodiment may be executed with the encoding mode according to only the sequential encoding mode.

In this case, the determination step S401 (in FIG. 4) nor the step S403 is performed, and the process involves only the performance of step S402. In other words, the two-dimensional discrete wavelet transform is performed either until each of the frequency components LLn, LHn, HLn, and HHn (obtained by performing the two-dimensional discrete wavelet transform n times) has a predetermined size of M×N, or for the default number of times. Among the frequency components obtained by the two-dimensional discrete wavelet transform, each frequency component having a size greater than M×N is divided into a plurality of blocks of size M×N, and the blocks are quantized and entropy-encoded (arithmetic-encoded).

According to the second embodiment described above, an efficient wavelet transform can be performed to provide sub-bands having a size suitable for being processed in an M×N-sized unit for encoding In a post-stage.

Third Embodiment

In the sequential encoding mode in the first embodiment or in the second embodiment, the two-dimensional discrete wavelet transform is performed either for the default number of times or until each of the frequency components LLn, LHn, HLn, and HHn (obtained by performing the two-dimensional discrete wavelet transform n times) has a predetermined size of M×N. However, the present invention is not limited only to the first and second embodiments.

For example, in another embodiment, the default number of times need not be preset. Only by considering that each of the frequency components LLn, LHn, HLn, and HHn obtained by performing the two-dimensional discrete wavelet transform n times has a predetermined size of M×N, the two-dimensional discrete wavelet transform may be performed until that condition is satisfied.

According to the third embodiment, an efficient wavelet transform can be performed to provide sub-bands having a size suitable for being processed by an M×N-sized unit for encoding in a post-stage.

Fourth Embodiment

The sequential encoding mode in the first embodiment performs the two-dimensional discrete wavelet transform for either the default number of times or until each of the frequency components LLn, LHn, HLn, and HHn (obtained by performing the two-dimensional discrete wavelet transform n times) has a predetermined size of M×N, while the non-sequential encoding mode in the first embodiment performs the two-dimensional discrete wavelet transform a predetermined number of times specified by a pre-set default value. However, the present invention, broadly construed, is not limited.

For example, as a fourth embodiment of the present invention, the "sequential encoding mode" is replaced by a "first encoding mode", and in the first encoding mode, the two-dimensional discrete wavelet transform is performed either until the condition is satisfied that each of the frequency components LLn, LHn, HLn, and HHn obtained by performing the two-dimensional discrete wavelet transform n times has a quarter of the predetermined size of M×N, that is, (M/2)×(N/2), or until the two-dimensional discrete wavelet transform has been performed the default number of times. Also the "non-sequential encoding mode" is replaced by a "second encoding mode", and in the second encoding mode, the two-dimensional discrete wavelet transform may be performed only the predetermined number of times specified by a predetermined default value.

In the fourth embodiment, a state as shown in FIG. 6D frequently occurs in both the first and second encoding modes. In the first encoding mode, the obtained frequency components LLn, LHn, HLn, and HHn do not substantially increase the processing load since they only need to be held until the three other Images are discrete-wavelet-transformed and similar frequency components are obtained. Also, it is highly possible that the encoding efficiency in the first encoding mode may be greater than that in the first embodiment.

In the fourth embodiment, a small processing load can maintain image quality as much as possible. In other words, an efficient wavelet transform can be performed in which a size of (M/2)×(N/2) suitable for an M×N-sized unit for encoding (in a post-stage) is provided. In accordance with this invention.

Fifth Embodiment

In the fourth embodiment, the number of times the two-dimensional discrete wavelet transform is performed is controlled, with the encoding mode taken into consideration. However, the present invention is not limited to the fourth embodiment. For example, according to a fifth embodiment, only the first encoding mode is always performed.

More specifically, the two-dimensional discrete wavelet transform is performed either a default number of times or until each of the frequency components LLn, LHn, HLn, and HHn (obtained by performing the two-dimensional discrete wavelet transform n times) has a quarter of a predetermined size of M×N, that is, (M/2)×(N/2).

According to the fifth embodiment, a small processing load can maintain image quality as much as possible. In other words, an efficient wavelet transform can be performed to provide sub-bands having a size of (M/2)×(N/2) suitable for an M×N-sized unit for encoding in a post-stage in accordance with this invention.

Sixth Embodiment

In the first encoding mode in the fourth embodiment and in the fifth embodiment, the two-dimensional discrete wavelet transform is performed either a default number of times or until each of the frequency components LLn, LHn, HLn, and HHn (obtained by performing the two-dimensional discrete wavelet transform n times) has a quarter of a predetermined size of M×N, that is, (M/2)×(N/2). However, the present invention is not limited to the first encoding mode in the fourth embodiment and the fifth embodiment.

For example, according to a sixth embodiment of this invention, the default number of times is not pre-set. More specifically, by simply considering that each of the frequency components LLn, LHn, HLn, and HHn obtained by performing the two-dimensional discrete wavelet transform n times has a quarter of a predetermined size of M×N, that is, (M/2)×(N/2), the two-dimensional discrete wavelet transform is performed until this condition is satisfied.

Also in the sixth embodiment, effects similar to those in the fifth embodiment can be obtained.

Seventh Embodiment

In the first encoding mode in the fourth embodiment and in the fifth embodiment, the two-dimensional discrete wavelet transform is performed either a default number of times or until each of the frequency components LLn, LHn, HLn, and HHn (obtained by performing the two-dimensional discrete wavelet transform n times) has a quarter of a predetermined size of M×N, that is, (M/2)×(N/2). However, the present invention is not limited thereto For example, the "quarter" may be changed to one-eighth, one-sixteenth, or same other suitable value, depending on the processing speed of the image processing apparatus, Its data storage capacity and/or other applicable operating criteria.

Similarly, in the sixth embodiment, based on a result obtained when the processing speed of the image processing apparatus according to the present invention and its data storage capacity are taken into consideration, the two-dimensional discrete wavelet transform may be performed until each of the frequency components LLn, LHn, HLn, and HHn (obtained by performing the two-dimensional discrete wavelet transform n times) has one-eighth or one-sixteenth, etc. of the predetermined size.

Modifications

The present invention may be applied in part of a system composed of a plurality of apparatuses (e.g., a host computer, an interface unit, a reader, a printer, etc.) and to part of an apparatus formed by a single unit (e.g., a copying machine, a facsimile machine, etc.).

The present invention is not limited only to an apparatus and method according to the foregoing embodiments. For example, is within the scope of this invention for the foregoing embodiments to be realized by providing a computer (e.g., a CPU or MPU) built into the above system or apparatus, with program code of software being employed for implementing each of the foregoing embodiments, and wherein the computer controls each device to operate in accordance with the program code.

In addition, in this case, the program code itself causes the functions of each of the foregoing embodiments to be performed. Accordingly, the program code itself and a unit for providing the computer with the program code, specifically, a storage medium containing the program code, are included in the present invention.

The types of storage media containing the program code may include, for example, floppy disks, hard disks, optical disks, magneto-optical disks, CD-ROMs, digital versatile disks, magnetic tapes, non-volatile memory cards, and ROMs.

The present invention includes not only the case in which the functions of each of the foregoing embodiments are realized by controlling each device in accordance with the provided program code, but also a case in which the foregoing embodiments are realized by the program code in association with an operating system running on the computer or with other application software.

Moreover, the present invention also includes a case in which, after the provided program code is stored in a memory provided on an add-in board for the computer or in an add-in unit connected to the computer, a CPU, or the like, provided on the add-in board or in the add-in unit executes all or part of actual processing and the executed processing realizes each of the foregoing embodiments.

As described above, according to the present invention, an efficient wavelet transform can be performed to provide sub-bands having a size suitable for being encoded in an M×N-sized encoding unit in a post-stage. In particular, a wavelet transform can be performed in which the number of times the original image is divided is optimal.

While the present invention has been described with reference to what are presently considered to be the preferred embodiments of the present invention, it is to be understood that the invention is not limited only to the disclosed embodiments, on the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:

an input unit, adapted to input an image;

a transform unit, adapted to perform a two-dimensional discrete wavelet transform on the image to generate a plurality of frequency components; and an entropy encoding unit, adapted to perform entropy encoding on each of the frequency components in M×N-sized units, where M and N each represent an integer equal to or greater than 1, wherein, in a first encoding mode, the transform unit performs the two-dimensional discrete wavelet transform on the image a predetermined number of times or for a number of times which allows a lowest frequency component (LL) to have a size of M×N, and in a second encoding mode, the transform unit performs the two-dimensional discrete wavelet transform on the image the predetermined number of times, wherein, in the transform, said transform unit performs a one-time two-dimensional discrete wavelet transform such that four frequency components LL, LH, HL, HH are output, and the LL is two-dimensional discrete wavelet transformed a next time, and in the first encoding mode, every time the one-time two-dimensional discrete wavelet transform is performed, whether the LL is of M×N size is checked, and if the LL is judged to be of M×N size, the next two-dimensional discrete wavelet transform is stopped, and if the LL is judged not to be of M×N size, the LL is two-dimensional discrete wavelet transformed.

2. An image processing apparatus according to claim 1, wherein the entropy encoding is arithmetic encoding.

3. An image processing apparatus according to claim 1, further comprising a quantization unit, adapted to quantize each of the frequency components in M×N-sized units before the entropy encoding is performed.

4. An image processing method, comprising:

an input step, of inputting an image;

a transform step, of performing a two-dimensional discrete wavelet transform on the image to generate a plurality of frequency components; and an entropy encoding step, of performing entropy encoding on each of the frequency components obtained in M×N-sized units in the transform step, where M and N each represent an integer equal to or greater than 1, wherein, in a first encoding mode, said transform step performs the two-dimensional discrete wavelet transform on the image either a predetermined number of times or for a number of times which allows a lowest frequency component (LL) to have a size of M×N, and in a second encoding mode, said transform step performs the two-dimensional discrete wavelet transform on the image the predetermined number of times, wherein, in the transform, said transform step performs a one-time two-dimensional discrete wavelet transform such that four frequency components LL, LH, HL, HH are output, and the LL is two-dimensional discrete wavelet transformed a next time, and in the first encoding mode, every time the one-time two-dimensional discrete wavelet transform is performed, whether the LL is of M×N size is checked, and if the LL is judged to be of M×N size, the next two-dimensional discrete wavelet transform is stopped, and if the LL is judged not to be of M×N size, the LL is two-dimensional discrete wavelet transformed.

5. An image processing apparatus comprising:

an input unit, adapted to input an image;

a transform unit, adapted to perform a two-dimensional discrete wavelet transform on the image to generate a plurality of frequency components; and an entropy encoding unit, adapted to perform entropy encoding on each of the frequency components in M×N-sized units, where M and N each represent an integer equal to or greater than 1, wherein said transform unit performs the two-dimensional discrete wavelet transform on the image either a predetermined number of times or for a number of times which allows a lowest frequency component (LL) to have a size of M×N, wherein, in the transform, said transform unit performs a one-time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of M×N size is checked, and if the LL is judged to be of M×N size, the next two-dimensional discrete wavelet transform is stopped, and if the LL is judged not to be of M×N size, the LL is two-dimensional discrete wavelet transformed.

6. An image processing method, comprising:

an input step, of inputting an image;

a transform step, of performing a two-dimensional discrete wavelet transform on the image to generate a plurality of frequency components; and an entropy encoding step, of performing entropy encoding on each of the frequency components obtained in M×N-sized units in said transform step, where M and N each represent an integer equal to or greater than 1, wherein said transform step performs the two-dimensional discrete wavelet transform on the image either a predetermined number of times or for a number of times which allows a lowest frequency component (LL) to have a size of M×N, wherein, in the transform, said transform step performs a one-time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of M×N size is checked, and if the LL is judged to be of M×N size, the next two-dimensional discrete wavelet transform is stopped, and if the LL is judged not to be of M×N size, the LL is two-dimensional discrete wavelet transformed.

7. An image processing apparatus comprising:

an input unit, adapted to input an image;

a transform unit, adapted to perform a two-dimensional discrete wavelet transform on the image to generate a plurality of frequency components; and an entropy encoding unit, adapted to perform entropy encoding on each of the frequency components in M×N-sized units, where M and N each represent an integer equal to or greater than 1, wherein said transform unit performs the two-dimensional discrete wavelet transform on the image for a number of times which allows a lowest frequency component (LL) to have a size of M×N, wherein, in the transform, said transform unit performs a one-time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of M×N size is checked, and if the LL is judged to be of M×N size, the next two-dimensional discrete wavelet transform is stopped, and if the LL is judged not to be of M×N size, the LL is two-dimensional discrete wavelet transformed.

8. An image processing method, comprising:

an input step, of inputting an image;

a transform step, of performing a two-dimensional discrete wavelet transform on the image to generate a plurality of frequency components; and an entropy encoding step, of performing entropy encoding on each of the frequency components obtained in M×N-sized units in said transform step, where M and N each represent an integer equal to or greater than 1, wherein said transform step performs the two-dimensional discrete wavelet transform on the image for a number of times which allows a lowest frequency component (LL) to have a size of M×N, wherein, in the transform, said transform step performs a one-time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of M×N size is checked, and if the LL is judged to be of M×N size, the next two-dimensional discrete wavelet transform is stopped, and if the LL is judged not to be of M×N size, the LL is two-dimensional discrete wavelet transformed.

9. An image processing apparatus comprising:

an input unit, adapted to input an image;

a transform unit, adapted to perform a two-dimensional discrete wavelet transform on the image to generate a plurality of frequency components; and an entropy encoding unit, adapted to perform entropy encoding on each of the frequency components in M×N-sized units, where M and N each represent an integer equal to or greater than 1, wherein, in a first encoding mode, the transform unit performs the two-dimensional discrete wavelet transform on the image either a predetermined number of times or for a number of times which allows a lowest frequency component (LL) to have a predetermined size that is a function of a size of M×N, and in a second encoding mode, the transform unit performs the two-dimensional discrete wavelet transform on the image the predetermined number of times, wherein, in the transform, said transform unit performs a one-time two-dimensional discrete wavelet transform such that four frequency components LL, LH, HL, HH are output, and the LL is two-dimensional discrete wavelet transformed a next time, and in the first encoding mode, every time the one-time two-dimensional discrete wavelet transform is performed, whether the LL is of a predetermined size based on the M×N size is checked, and if the LL is judged to be of the predetermined size, the next two-dimensional discrete wavelet transform is stopped, and if the LL is judged not to be of the predetermined size, the LL is two-dimensional discrete wavelet transformed.

10. An image processing apparatus according to claim 9, wherein the predetermined size is (M/2)×(N/2).

11. An image processing method, comprising:

an input step, adapted to input an image;

a transform step, adapted to perform a two-dimensional discrete wavelet transform on the image to generate a plurality of frequency components; and an entropy encoding step, adapted to perform entropy encoding on each of the frequency components obtained in M×N-sized units in said transform step, where M and N each represent an integer equal to or greater than 1, wherein, in a first encoding mode, said transform step performs the two-dimensional discrete wavelet transform on the image either a predetermined number of times or for a number of times which allows a lowest frequency component (LL) to have a predetermined size that is a function of a size of M×N, and in a second encoding mode, said transform step performs the two-dimensional discrete wavelet transform on the image the predetermined number of times, wherein, in the transform, said transform step performs a one-time two-dimensional discrete wavelet transform such that four frequency components LL, LH, HL, HH are output, and the LL is two-dimensional discrete wavelet transformed a next time, and in the first encoding mode, every time the one-time two-dimensional discrete wavelet transform is performed, whether the LL is of a predetermined size based on the M×N size is checked, and if the LL is judged to be of the predetermined size, the next two-dimensional discrete wavelet transform is stopped, and if the LL is judged not to be of said predetermined size, the LL is two-dimensional discrete wavelet transformed.

12. An image processing apparatus, comprising:

an input unit, adapted to input an image;

a transform unit, adapted to perform a two-dimensional discrete wavelet transform on the image to generate a plurality of frequency components; and an entropy encoding unit, adapted to perform entropy encoding on each of the frequency components in M×N-sized units, where M and N each represent an integer equal to or greater than 1, wherein said transform unit performs the two-dimensional discrete wavelet transform on the image either a predetermined number of times or for a number of times which allows a lowest frequency component (LL) to have a predetermined size that is a function of a size of M×N, wherein, in the transform, said transform unit performs a one-time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of a predetermined size based on the M×N size is checked, and if the LL is judged to be of the predetermined size, the next two-dimensional discrete wavelet transform is stopped, and if the LL is judged not to be of the predetermined size, the LL is two-dimensional discrete wavelet transformed.

13. An image processing method, comprising:

an input step, of inputting an image;

a transform step, of performing a two-dimensional discrete wavelet transform on the image to generate a plurality of frequency components; and an entropy encoding step, of performing entropy encoding, in M×N-sized units, on each of the frequency components obtained in said transform step, where M and N each represent an integer equal to or greater than 1, wherein said transform step performs the two-dimensional discrete wavelet transform on the image either a predetermined number of times or for a number of times which allows a lowest frequency component (LL) to have a predetermined size that is a function of a size of M×N, wherein, in the transform, said transform step performs a one-time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of a predetermined size based on the M×N size is checked, and if the LL is judged to be of the predetermined size, the next two-dimensional discrete wavelet transform is stopped, and if the LL is judged not to be of the predetermined size, the LL is two-dimensional discrete wavelet transformed.

14. An image processing apparatus, comprising:

an input unit, adapted to input an image;

a transform unit, adapted to perform a two-dimensional discrete wavelet transform on the image to generate a plurality of frequency components; and an entropy encoding unit, adapted to perform entropy encoding on each of the frequency components in M×N-sized units, where M and N each represent an integer equal to or greater than 1, wherein said transform unit performs the two-dimensional discrete wavelet transform on the image for a number of times which allows a lowest frequency component (LL) to have a predetermined size that is a function of a size of M×N, wherein, in the transform, said transform unit performs a one-time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of a predetermined size based on the M×N size is checked, and if the LL is judged to be of the predetermined size, the next two-dimensional discrete wavelet transform is stopped, and if the LL is judged not to be of the predetermined size, the LL is two-dimensional discrete wavelet transformed.

15. An image processing method, comprising:

an input step, of inputting an image;

a transform step, of performing a two-dimensional discrete wavelet transform on the image to generate a plurality of frequency components; and an entropy encoding step, of performing entropy encoding on each of the frequency components obtained in M×N-sized units in said transform step, where M and N each represent an integer equal to or greater than 1, wherein said transform step performs the two-dimensional discrete wavelet transform on the image for a number of times which allows a lowest frequency component (LL) to have a predetermined size that is a function of a size of M×N, wherein, in the transform, said transform step performs a one-time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of a predetermined size based on the M×N size is checked, and if the LL is judged to be of the predetermined size, the next two-dimensional discrete wavelet transform is stopped, and if the LL is judged not to be of the predetermined size, the LL is two-dimensional discrete wavelet transformed.

16. A computer-readable storage medium containing an image processing program, said image processing program comprising code for performing the steps of:

a transform step, of performing a two-dimensional discrete wavelet transform on an input image to generate a plurality of frequency components; and an entropy encoding step, of performing entropy encoding on each of the frequency components obtained in M×N-sized units in said transform step, where M and N each represent an integer equal to or greater than 1, wherein, in a first encoding mode, said transform step performs the two-dimensional discrete wavelet transform on the image either a predetermined number of times or for a number of times which allows a lowest frequency component (LL) to have a size of M×N, and in a second encoding mode, the transform step performs the two-dimensional discrete wavelet transform on the image the predetermined number of times, wherein, in the transform, said transform step performs a one-time two-dimensional discrete wavelet transform such that four frequency components LL, LH, HL, HH are output, and the LL is a two-dimensional discrete wavelet transformed a next time, and in the first encoding mode, every time the one-time two-dimensional discrete wavelet transform is performed, whether the LL is of M×N size is checked, and if the LL is judged to be of M×N size, the next two-dimensional discrete wavelet transform is stopped, and if the LL is judged not to be of M×N size, the LL is two-dimensional discrete wavelet transformed.

17. A computer-readable storage medium containing an image processing program, said image processing program comprising code for performing the steps of:

a transform step, of performing a two-dimensional discrete wavelet transform on an input image to generate a plurality of frequency components; and an entropy encoding step, of performing entropy encoding on each of the frequency components obtained in M×N-sized units in said transform step, where M and N each represent an integer equal to or greater than 1, wherein said transform step performs the two-dimensional discrete wavelet transform on the image either a predetermined number of times or for a number of times which allows a lowest frequency component (LL) to have a size of M×N, wherein, in the transform, said transform step performs a one-time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of M×N size is checked, and if the LL is judged to be of M×N size, the next two-dimensional discrete wavelet transform is stopped, and if the LL is judged not to be of M×N size, the LL is two-dimensional discrete wavelet transformed.

18. A computer-readable storage medium containing an image processing program, said image processing program comprising code for performing the steps of:

a transform step, of performing a two-dimensional discrete wavelet transform on an input image to generate a plurality of frequency components; and an entropy encoding step, of performing entropy encoding on each of the frequency components obtained in M×N-sized units in said transform step, where M and N each represent an integer equal to or greater than 1, wherein said transform step performs the two-dimensional discrete wavelet transform on the image for a number of times which allows a lowest frequency component (LL) to have a size of M×N, wherein, in the transform, said transform step performs a one time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of M×N size is checked, and if the LL is judged to be of M×N size, the next two-dimensional discrete wavelet transform is stopped, and if the LL is judged not to be of M×N size, the LL is two-dimensional discrete wavelet transformed.

19. A computer-readable storage medium containing an image processing program, said image processing program comprising code for performing the steps of:

a transform step, of performing a two-dimensional discrete wavelet transform on an input image to generate a plurality of frequency components; and an entropy encoding step, of performing entropy encoding on each of the frequency components obtained in M×N-sized units in said transform step, where M and N each represent an integer equal to or greater than 1, wherein, in a first encoding mode, said transform step performs the two-dimensional discrete wavelet transform on the image either a predetermined number of times or for a number of times which allows a lowest frequency component (LL) to have a predetermined size based on a size of M×N, and in a second encoding mode, said transform step performs the two-dimensional discrete wavelet transform on the image the predetermined number of times, wherein, in the transform, said transform step performs a one-time two-dimensional discrete wavelet transform such that four frequency components LL, LH, HL, HH are output, and the LL is two-dimensional discrete wavelet transformed a next time, and in the first encoding mode, every time the one-time two-dimensional discrete wavelet transform is performed, whether the LL is of a predetermined size based on the M×N size is checked, and if the LL is judged to be of the predetermined size, the next two-dimensional discrete wavelet transform is stopped, and if the LL is judged not to be of the predetermined size, the LL is two-dimensional discrete wavelet transformed.

20. A computer-readable storage medium containing an image processing program, said image processing program comprising code for performing the steps of:

a transform step, of performing a two-dimensional discrete wavelet transform on an input image to generate a plurality of frequency components; and an entropy encoding step, of performing entropy encoding on each of the frequency components obtained in M×N-sized units in said transform step, where M and N each represent an integer equal to or greater than 1, wherein said transform step performs the two-dimensional discrete wavelet transform on the image either a predetermined number of times or for a number of times which allows a lowest frequency component (LL) to have a predetermined size that is a function of a size of M×N, wherein, in the transform, said transform step performs a one-time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of a predetermined size based on the M×N size is checked, and if the LL is judged to be of the predetermined size, the next two-dimensional discrete wavelet transform is stopped, and if the LL is judged not to be of the predetermined size, the LL is two-dimensional discrete wavelet transformed.

21. A computer-readable storage medium containing an image processing program, said image processing program comprising code for performing the steps of:

a transform step, of performing a two-dimensional discrete wavelet transform on an input image to generate a plurality of frequency components; and an entropy encoding step, of performing entropy encoding on each of the frequency components obtained in M×N-sized units in said transform step, where M and N each represent an integer equal to or greater than 1, wherein said transform step performs the two-dimensional discrete wavelet transform on the image for a number of times which allows a lowest frequency component (LL) to have a predetermined size that is a function of a size of M×N, wherein, in the transform, said transform step performs a one-time two-dimensional discrete wavelet transform such that four frequency components LL, LH, HL, HH are output, and the LL is two-dimensional discrete wavelet transformed a next time, and every time the one-time two-dimensional discrete wavelet transform is performed, whether the LL is of a predetermined size based on the M×N size is checked, and if the LL is judged to be of the predetermined size, the next two-dimensional discrete wavelet transform is stopped, and if the LL is judged not to be of the predetermined size, the LL is two-dimensional discrete wavelet transformed.

* * * * *

UNITED STATES PATENT AND TRADEMARK OFFICE
CERTIFICATE OF CORRECTION

| | | |
|---|---|---|
| PATENT NO. | : 6,768,819 B2 | |
| APPLICATION NO. | : 09/797885 | |
| DATED | : July 27, 2004 | |
| INVENTOR(S) | : Takeshi Yamazaki et al. | |

It is certified that error appears in the above-identified patent and that said Letters Patent is hereby corrected as shown below:

COLUMN 1:

Line 39, "It" should read --it--.

COLUMN 3:

Line 66, "image" should read --image.--.

COLUMN 4:

Line 20, "shown" should read --shown in--; and
　　Line 50, "efficiency" should read --efficiency.--.

COLUMN 5:

Line 15, "In" should read --in--;
　　Line 40, "and LHn" should read --and HHn--; and
　　Line 47, "RH1," should read --HH1,--;
　　Line 56, "to to" should read --to--; and
　　Line 59, "another-specific" should read --another specific--.

COLUMN 6:

Line 15, "fo" should read --for--; and
　　Line 67, "modes" should read --mode,--.

COLUMN 8:

Line 26, "In" should read --in--;
　　Line 32, "In" should read --in--; and
　　Line 53, "In" should read --in--.

UNITED STATES PATENT AND TRADEMARK OFFICE
CERTIFICATE OF CORRECTION

PATENT NO. : 6,768,819 B2
APPLICATION NO. : 09/797885
DATED : July 27, 2004
INVENTOR(S) : Takeshi Yamazaki et al.

It is certified that error appears in the above-identified patent and that said Letters Patent is hereby corrected as shown below:

COLUMN 9:

Line 38, "Images" should read --images--; and
Line 47, "provided. In" should read --provided, in--.

COLUMN 10:

Line 28, "thereto" should read --thereto.--;
Line 30, "same" should read --some--;
Line 31, "Its" should read --its--; and
Line 50, "is" should read --it is--.

COLUMN 11:

Line 25, "embodiments, on" should read --embodiments. On--.

COLUMN 17:

Line 4, "a" should be deleted.

Signed and Sealed this

Third Day of June, 2008

JON W. DUDAS
*Director of the United States Patent and Trademark Office*